UNITED STATES PATENT OFFICE.

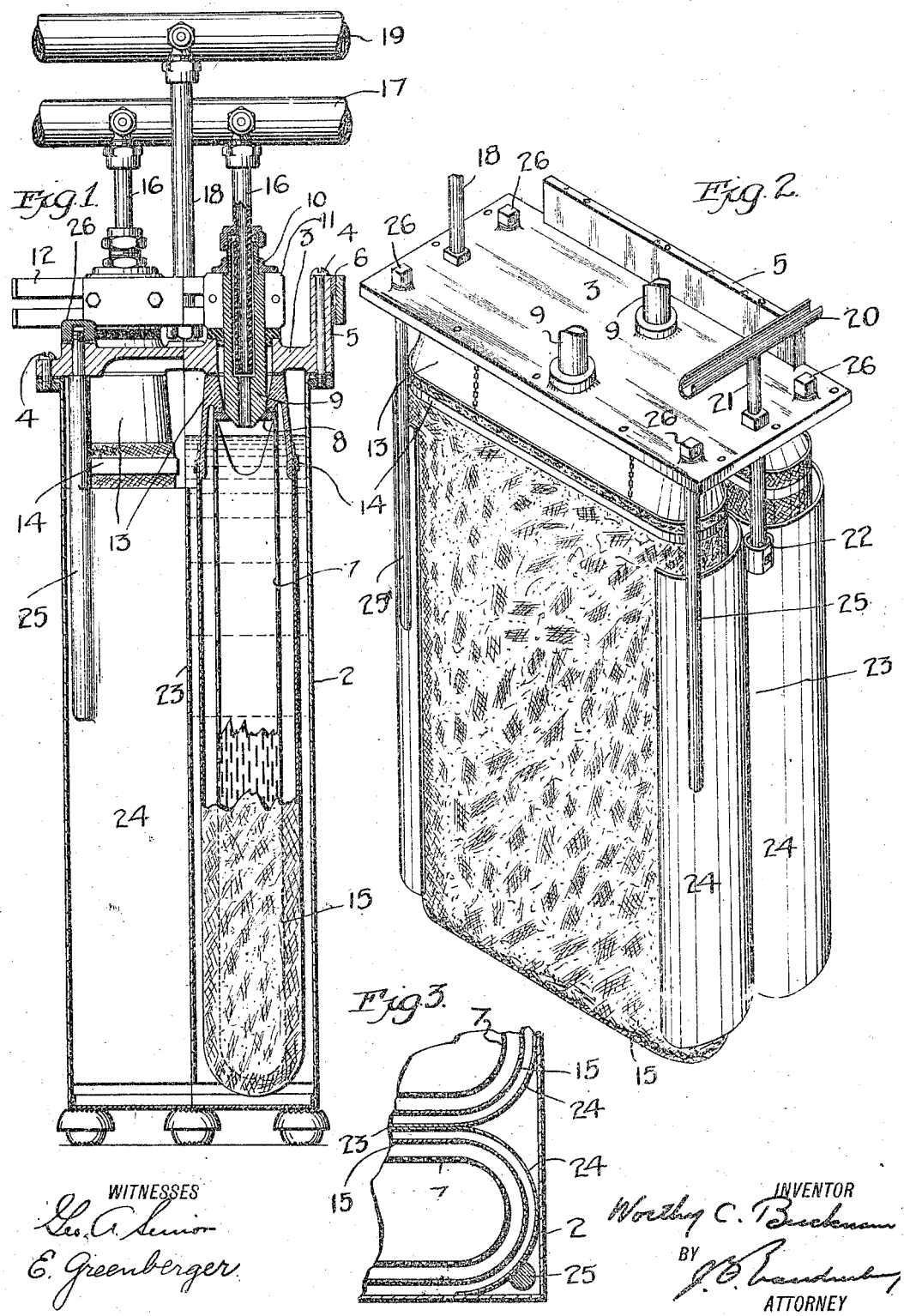

WORTHY C. BUCKNAM, OF JERSEY CITY, NEW JERSEY, ASSIGNOR TO DAVIS-BOURNONVILLE COMPANY, OF NEW YORK, N. Y., A CORPORATION OF NEW YORK.

ELECTROLYTIC CELL.

1,172,932.  Specification of Letters Patent.  Patented Feb. 22, 1916.

Application filed October 22, 1914. Serial No. 867,986.

*To all whom it may concern:*

Be it known that I, WORTHY C. BUCKNAM, a citizen of the United States, and a resident of Marion, Jersey City, in the county of Hudson and State of New Jersey, have invented certain new and useful Improvements in Electrolytic Cells, of which the following is a specification.

My invention relates to electrolytic cells for the production of oxygen and hydrogen by the electrolysis of water, and the object is to improve the construction, to reduce the manufacturing cost, to facilitate assemblage, and to guard against injury to the asbestos sacks or diaphragms by which the anodes are inclosed.

The invention comprises a certain combination and arrangement of parts, which will now be described and hereinafter more particularly pointed out in the claims.

In the drawings illustrating the invention: Figure 1 is a vertical transverse section through the cell, the plane of the left-hand section being taken just inside the end wall of the tank and the right-hand portion of the view being taken on planes successively removed from the front of the tank; Fig. 2 is a perspective view of the cover with the parts attached thereto; and Fig. 3 is a fragmentary horizontal section.

The cell comprises a rectangular tank body 2, the walls of which constitute part of the cathode element of the cell, and a cover 3 held by bolts 4, tightly closing the top of the tank, and bearing a flange 5 for attachment of the negative terminal 6. Two anodes 7 are suspended in general parallelism from the cover, from which they are insulated. In the particular construction shown these anodes are hollow bodies formed of slitted sheet metal, each anode comprising parallel adjacent side walls connected by rounded ends and a rounded bottom. The upper edges of the sheet metal walls of the anodes are united to conducting and supporting bars 8, which in turn are united to hollow conducting and supporting studs 9, the latter extending upward through apertures in the cover and being threaded at their upper ends to receive nuts 10, which bear upon the tops of terminal blocks 11 resting on the cover and having the positive terminal 12 clamped thereto. Over the anodes are separators 13 of non-conducting material and of inverted trough form, also supported by the bars 8 and studs 9, the latter passing through the tops of the separators. Fastened to the separators by clamp bands 14 are depending asbestos sacks 15, which inclose the anodes below the liquid level and with the separators form complete insulating inclosures about the positive electrodes. The walls of the separators plunge for a sufficient distance beneath the electrolyte level to insure against communication between the oxygen-collecting chambers, formed by the separators, and the hydrogen-collecting space beneath the cover within the general interior of the tank; and the asbestos sacks constitute diaphragms, which offer no resistance to the current but prevent mingling of the evolved gases as long as they are submerged in the liquid. The oxygen is carried off through the hollow studs 9 and tubes 16 of insulating material to off-take piping 17, while the hydrogen escapes through the cover by an insulating tube 18 to piping 19. Replenishment of the liquid in the tanks is effected from an open trough 20 and a downtake 21 passing through the cover and plunging beneath the electrolyte for a suitable distance, where it rests on a block 22 fixed to the partition.

The cathode element of the cell, heretofore described as formed in part by the walls of the tank, which is electrically connected with the cover by bolts 4, is completed by a partition 23, dividing the interior of the tank into narrow, upright compartments, each occupied by an anode with its inclosing separator and sack. This partition is formed of two plates, united back to back, with their end portions 24 separated and curved in reversed directions, in general conformity with the curve of the anodes, into proximity or contact with the end and side walls of the tank, thus forming pockets in which it is important to dispose the sacks without danger of tearing. In accordance with the invention I support the cathode partition from the cover, so that all of the internal parts of the cell can be conveniently and safely assembled with the cover and then inserted as a unit into the body of the tank. In this way the sacks are protected by the cathode elements when being inserted or removed from the tank. The supports comprise a suitable number of elongated studs 25, which are made of adequate cross-section for conducting purposes and have their lower portions extending along and welded to the curved extensions 24 of the partitions and their upper portions passed through the cover and rigidly and electrically connected therewith by nuts 26. As thus supported the upper edge of the partition is spaced below the cover, thus permitting free passage of hydrogen beneath the same, and its bottom is also spaced from the bottom of the tank in order to permit free communication for the electrolyte from one part of the tank to the other. When the cover is put in place with its assembled, supported parts the partition enters the tank with a sliding fit, and by virtue of its reversely-directed extensions 24 receives lateral support from the opposite side walls of the tank.

The general features of the cell illustrated herein form the invention of another, and accordingly I do not claim the same, but What I do claim as new is:

1. In a cell for the electrolysis of water, a tank body, a cover for closing the top of the same, a partition dividing the interior of the tank body into narrow vertical compartments, said partition and the walls of the tank body together forming the cathode element of the cell, anodes of large surface disposed vertically within said compartments, separators over the anodes and beneath the cover, and diaphragm sacks depending from the separators and inclosing the anodes, said partition on the one hand and the anodes, separators and sacks on the other hand being all supported from the cover.

2. In a cell for the electrolysis of water, a tank body the walls of which constitute part of the cathode element of the cell, a cover closing the top of the tank body and electrically connected therewith, anodes of large surface suspended and insulated from the cover, and diaphragms also supported from the cover, in combination with a partition constituting the remainder of the cathode element and dividing the interior of the tank body into narrow vertical compartments containing the anodes and diaphragms, and members supporting said partition from and in electrical connection with the cover and with its top at a distance below the same.

3. In a cell for the electrolysis of water, a tank body the walls of which constitute part of the cathode element of the cell, a cover closing the top of the tank body, and anodes and inclosing diaphragm sacks suspended from the cover, in combination with a cathode partition also supported from the cover and having a sliding fit in the tank body with its horizontal extremities extended laterally and receiving support from the opposite side walls of the tank.

4. In a cell for the electrolysis of water, the combination of a tank body, a cover for closing the top of the same, oblong anodes, separators and diaphragm sacks all supported from the cover, and a cathode element also supported from the cover and forming pockets for the protection of the sacks when the parts are inserted and removed.

In testimony whereof I have signed my name in the presence of two subscribing witnesses.

WORTHY C. BUCKNAM.

Witnesses:
J. F. BRANDENBURG,
E. GREENBERGER.